May 13, 1930.  B. MOSES  1,758,801
OPTICAL DEVICE
Filed Aug. 8, 1927
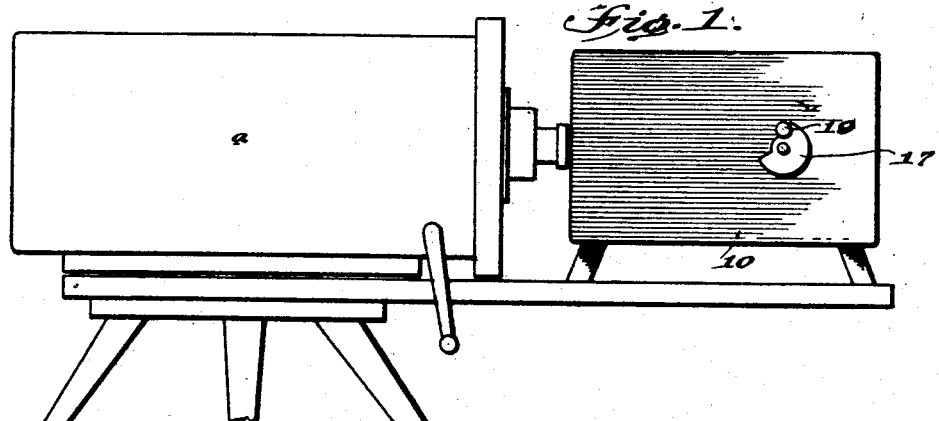
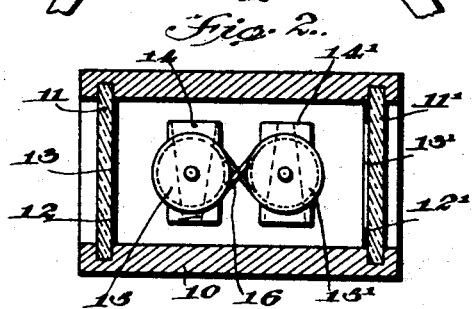
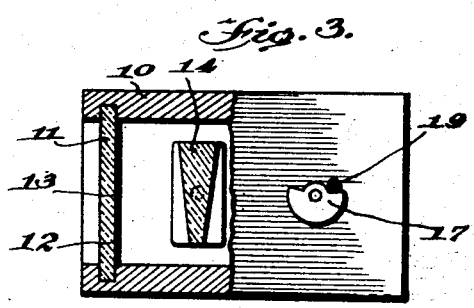
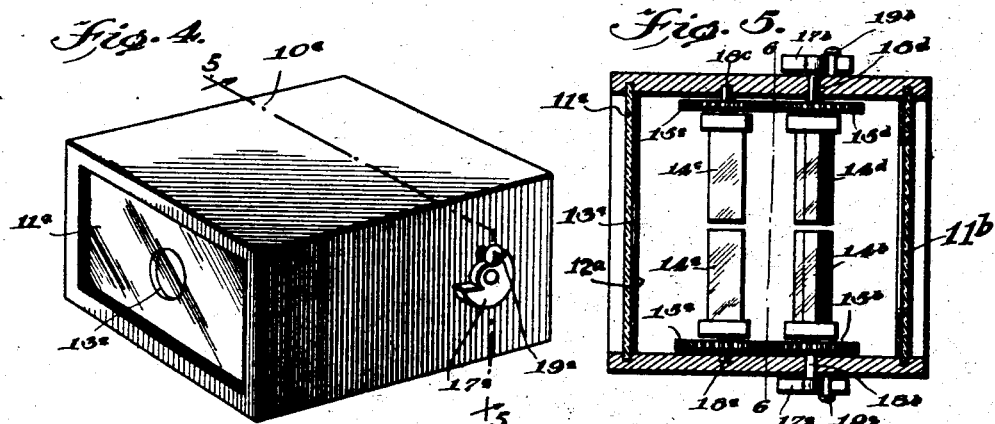
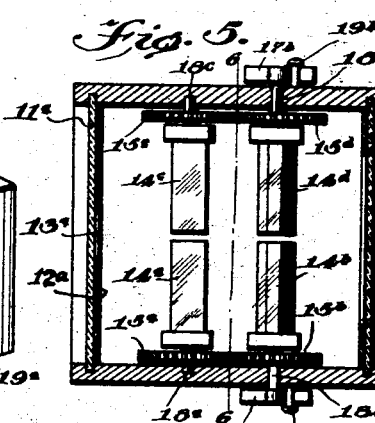
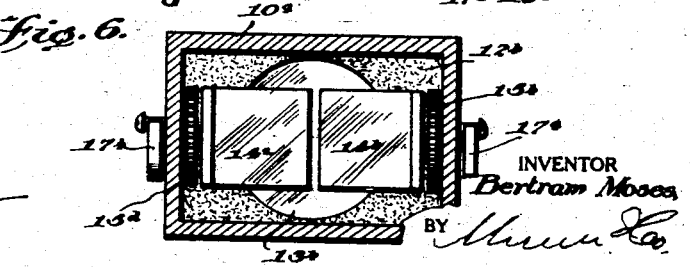
WITNESS
INVENTOR
Bertram Moses
BY
ATTORNEYS Patented May 13, 1930

1,758,801

UNITED STATES PATENT OFFICE

BERTRAM MOSES, OF GARDEN CITY, KANSAS

OPTICAL DEVICE

Application filed August 8, 1927. Serial No. 211,478.

This invention relates to optical devices generally, and has for its principal object to provide for a type of such device primarily intended for amusement purposes, whereby certain optical illusions or effects will be produced when objects are viewed through the same by a person, or, if employed in connection with a camera, such optical illusions or effects will be reproduced on the films or plates of the camera, or, if used in connection with a motion picture camera or projector, these optical illusions and effects will be either reproduced on the film of the camera or projected upon a screen or other image receiving surface, usually employed to display motion pictures and the like.

A further object of the invention is to provide for a device of the class described, and one wherein the objects to be viewed, photographed or reproduced, as the case may be, will appear to the eye, either directly or indirectly, as, in the first instance, through the device, or when viewed on a finished film or plate, or on a screen or the like, as being out of proportion or otherwise distorted out of or from normal proportions, shape and size.

Another object of the invention is to provide for a comparatively simple and inexpensive device as hereinbefore characterized, and one capable of being employed in any one of its stated uses by unskilled persons, as well as by professional photographers or motion picture operators, and which may be handled with the facility of an ordinary camera.

The invention comprises generally a closed housing, preferably rectangular in form, having its top, bottom and side walls formed of an opaque material such as wood, metal or the like, and its end walls of a transparent material, such as glass or the like, whereby a line of vision is established between the end walls, whereby an object viewed through the same will be visible to the eye. In practice, one of the transparent end walls is rendered opaque over its entire surface except for a relatively small centrally disposed circular space forming the eye-piece of the device, while the other of the end walls is rendered opaque over a minor area of its outer portions so as to provide for a centered circular transparent space of relatively large diameter to be presented toward an object to be viewed. These transparent vision spaces in the end walls may be varied in shape, size and proportion, according to desired details of the construction and correspondingly for the various uses to which the device may be put. Within the housing or casing, between the end walls thereof, two or more prisms are to be positioned in the line of vision through the transparent viewing spaces of the end walls, and these prisms are to be rotated to various relative positions one with respect to the other whereby the desired optical effects of the device will be obtained. When viewing an object through the device, with the prisms disposed in an initial position of operation, as will be hereinafter fully explained, the object will appear to the eye of the observer in its normal condition, but, upon moving the prisms to different positions, relative to one another and to the vision spaces of the end walls, the object will then appear to be distorted, either flattened, shortened or lengthened, or otherwise out of proportion from its normal state, depending upon the relative positions of the prisms throughout the entire range of their movement.

With the foregoing and other equally important objects in view, the invention resides in the certain new and useful construction and arrangement of parts as will be hereinafter more fully described, set forth in the appended claims, and illustrated in the accompanying drawings, in which:

Figure 1 is a side elevation of the device as it appears when associated with a conventional form of photographic or picture projecting apparatus, Figure 2 is a vertical longitudinal section, Figure 3 is a side elevation, partly in section, Figure 4 is a perspective view of a slightly modified form of the device, Figure 5 is a horizontal section taken on the line 5—5 of Figure 4, and Figure 6 is a vertical transverse section taken on the line 6—6 of Figure 5.

Referring to the drawing, wherein similar characters of reference designate corresponding parts throughout the several views thereof, and more particularly to Figures 1 to 3 inclusive, the first form of the invention as shown therein comprises the casing or housing 10, preferably in the form of a substantially rectangular box-like body, having its top, bottom and side walls made from an opaque material, such as wood, metal or the like, and its opposite end walls 11 and 11' of a transparent material such as glass or the like. These end walls 11 and 11' have their inner surfaces rendered opaque, as at 12 and 12', for a portion of their respective areas, the wall 11 sufficiently so as to leave only a comparatively small centrally disposed and preferably circular space 13 thereon transparent (which space 13 will be hereinafter referred to as the eye-piece of the device), and the wall 11' a much longer circular space 13' (hereinafter to be referred to as the field-lens of the device).

For the purpose of forming the transparent space or eye-piece 13 and the similar space or field lens 13', the portions of the inner surfaces of the walls 11 and 11', surrounding these spaces may be coated with a suitable opaque substance, or the same may be formed by cut-outs from sheets of an opaque material laid against the inner walls of the said walls, as may be desired or most convenient.

Journalled transversely of the casing or housing 10, in spaced parallel relation and across the line of vision or focus between the eye-piece 13 and the field lens 13', are a pair of reversely arranged prisms 14 and 14', which are to be rotated to various relative angular positions, one with respect to the other, and consequently with respect to the eye-piece and field-lens. This rotation of the prisms 14 and 14' is accomplished through the medium of associated rotative elements 15 and 15' operatively connected together by a wrapping connector 16, the latter being preferably in the form of a crossed belt, whereby they are rotated in reversed directions. For operating the prisms 14 and 14', and their actuating elements, a finger piece 17 is attached on one of the journalled ends of one of the prisms which is projected outwardly of the casing or housing 10 for the purpose.

In the use of the device as thus constructed and arranged, the operator will place one eye to the eye piece 13 with the field lens 14' directed toward the object to be viewed, when, with the prisms 14 and 14' disposed in parallel relation, the object will appear in natural proportion and detail, but, as the prisms are rotated out of this parallel relation, by the manipulation of the finger piece 17, the object will appear out of proportion and otherwise distorted.

Referring now to Figures 4 to 6 inclusive, the modified form of the device as shown therein, comprising the casing or housing $10^a$, has the inner surfaces of its transparent end walls $11^a$ and $11^b$ rendered opaque, as at $12^a$ and $12^b$, around the eye piece $13^a$ and the field-lens $13^b$, as in the first instance of the invention, but the two prisms 14 and 14' of the latter, are replaced with four prisms $14^a$, $14^b$, $14^c$ and $14^d$, arranged in pairs disposed immediately to either side of the longitudinal center of the casing or housing 10, substantially as shown. In this instance, the prisms $14^a$ and $14^b$ are journalled in parallel relation at their outer ends in the adjacent side wall of the casing or housing 10, while the prisms $14^c$ and $14^d$ are similarly journalled at their outer ends in the opposite side wall. In this position, the prisms $14^a$ and $14^b$ are in end to end alignment respectively with the prisms $14^c$ and $14^d$, with their inner adjacent ends disposed in closely spaced relation. The spindles $18^a$ and $18^b$, by means of which the prisms $14^a$ and $14^b$ are journalled in the adjacent side wall of the casing or housing 10, have secured thereon, inwardly of the said side wall gears $15^a$ and $15^b$ respectively arranged in meshed relation for simultaneous rotation when in motion. The spindle $18^b$ is projected outwardly of the side wall of the casing or housing 10, in which it is journalled, and has a finger piece $17^a$ secured thereon for its operation. Similarly, the prisms $14^c$ and $14^d$ are supported on the inner ends of spindles $18^c$ and $18^d$ journalled in the opposite side wall of the casing or housing $10^a$, and the spindle $18^d$ has its outer end projected outwardly of the side wall in which it is journalled and provided with a finger piece $17^b$. Mounted on the inner ends of the spindles $18^c$ and $18^d$ are gears $15^c$ and $15^d$ respectively, and which are arranged in mesh one with the other.

In the operation of the modified form of the device, with the eye at the eye piece $13^a$ and the field lens $13^b$ trained on an object, the latter, when the prisms $14^a$, $14^b$ and $14^c$, $14^d$, of each pair thereof, are disposed in parallelism, will appear in its natural form and proportion, but, as the prisms are rotated, by the manipulation of the finger pieces $17^a$ and $17^b$, to vary the relation of the pairs of prisms angularly with respect to each other, the object will then appear distorted and out of proportion, and correspondingly so with the varying angular movements of the prisms.

In addition to being used to produce the kaleidoscopic effects, as hereinbefore described, the device may be employed in conjunction with either one or the other of an ordinary camera; a stereopticon machine; a motion picture camera, or a motion picture projecting machine, substantially as shown in Figure 1 as at $a$, with equal effect, whereby objects will be photographed in varying distorted shapes, on the one hand, or pictures of natural objects will be projected through the device and onto a display surface or screen in varying distorted shapes, on the other hand. In being so employed, the device will be positioned directly in front of any one of the cameras or projectors mentioned, with the eye piece 13 or 13', as the case may be, disposed in abutting relation against the focusing lens opening thereof, and whereby the longitudinal axis of the device will coincide with that of the camera or projector with which it may be associated. As shown in Figures 3, 4, 5 and 6, the finger pieces 17 and 17$^a$, 17$^b$, are each cut away at one side of their peripheral edges to form oppositely disposed shoulders cooperative with stops 19, 19$^a$ and 19$^b$ respectively, whereby to limit the rotative movements thereof, and consequently, the angular adjustment of the several prisms in opposite directions.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. A device of the class described comprising a casing open at its opposite ends, transparent members closing the open ends of said casing, prisms disposed in said casing, means for rotating said prisms, and an opaque member having a restricted sight opening in the same abutting one side of one of the said transparent members, said prisms being disposed in alinement with the said sight opening.

2. A device of the class described comprising a casing open at its opposite ends, transparent members closing the open ends of said casing, prisms disposed in said casing, means for rotating said prisms, an opaque member having a restricted sight opening in the same abutting one side of one of the said transparent members, and a second opaque member having an opening in the same of a greater area than the said sight opening abutted against one side of the other of said transparent members, said prisms being disposed in alinement with the said sight openings.

3. A device of the class described comprising a casing open at its opposite ends, transparent members closing the open ends of said casing, prisms disposed in said casing, means for rotating said prisms, an opaque member having a restricted sight opening in the same abutting one side of one of the said transparent members, a second opaque member having an opening in the same of a greater area than the said sight opening abutted against one side of the other of said transparent members, and means for limiting the rotative movement of said prisms and the actuating means therefor, said prisms being disposed in alinement with the said sight opening.

4. A device of the class described comprising a casing open at its opposite ends, transparent members closing the open ends of said casing, pairs of prisms arranged within said casing in longitudinally and transversely alined relation, means for imparting motion to said prisms, an opaque member having a restricted sight opening formed centrally in the same and arranged in abutting relation to the inner side of one of said transparent members, and a second opaque member having a sight opening formed centrally in the same and arranged in abutting relation with the inner side of the other of said transparent members, the sight opening of said last named opaque member being of a greater area than the sight opening in the other of said opaque members, said prisms being disposed in alinement with the said sight openings.

BERTRAM MOSES.